US012049908B2

(12) United States Patent
Lee

(10) Patent No.: US 12,049,908 B2
(45) Date of Patent: Jul. 30, 2024

(54) PRESSURE DIFFERENCE GENERATING APPARATUS

(71) Applicant: INDUSTRIAL TECHNOLOGY RESEARCH INSTITUTE, Hsinchu (TW)

(72) Inventor: Kang-Feng Lee, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 34 days.

(21) Appl. No.: 18/089,019

(22) Filed: Dec. 27, 2022

(65) Prior Publication Data

US 2024/0159250 A1 May 16, 2024

(30) Foreign Application Priority Data

Nov. 14, 2022 (TW) ................................ 111143352

(51) Int. Cl.
*F04F 5/20* (2006.01)
*F17D 1/065* (2006.01)

(52) U.S. Cl.
CPC ................ *F04F 5/20* (2013.01); *F17D 1/065* (2013.01); *Y10T 137/2224* (2015.04)

(58) Field of Classification Search
CPC ....... F04F 5/20; F17D 1/065; Y10T 137/2224
USPC .......................................................... 137/833
See application file for complete search history.

(56) References Cited

U.S. PATENT DOCUMENTS 6,701,715 B2 * 3/2004 Anderson ................. F02C 3/32 417/189
6,858,340 B2 * 2/2005 Sugawara ............... F04F 5/461 429/513
7,077,152 B2 * 7/2006 Karp ................. B01L 3/502784 137/806

(Continued)

FOREIGN PATENT DOCUMENTS

CN 109630383 A 4/2019
CN 110036204 A 7/2019

(Continued)

OTHER PUBLICATIONS

Taiwan Patent Office, "Office Action", Jul. 31, 2023, Taiwan.

(Continued)

*Primary Examiner* — John Bastianelli
(74) *Attorney, Agent, or Firm* — Locke Lord LLP; Tim Tingkang Xia, Esq.

(57) ABSTRACT

A pressure difference generating apparatus includes a first pipe, a second pipe and a third pipe. The first pipe have a first inlet. The second pipe disposed inside of the first pipe has a conical inlet runner, a conical outlet runner and a neck portion between the conical inlet runner and outlet runner. The third pipe has a third conical outlet portion extending into the conical inlet runner. A first fluid and a second fluid flow into the first pipe and the third pipe separately in different flow rates. A negative pressure generated between the third conical outlet portion and the conical inlet runner allows at least part of the first fluid to flow into the conical inlet runner, then the neck portion, then the conical outlet runner, and finally out of the second pipe with the second fluid.

12 Claims, 10 Drawing Sheets

(56) References Cited

U.S. PATENT DOCUMENTS

| | | | | | |
|---|---|---|---|---|---|
| 7,334,427 | B2 * | 2/2008 | Ozaki | F04F 5/04 62/500 |
| 7,536,864 | B2 * | 5/2009 | Wolfe | F01D 17/105 60/785 |
| 8,142,169 | B2 * | 3/2012 | Whaling | F02C 6/08 417/189 |
| 8,523,091 | B2 * | 9/2013 | Ogata | F04F 5/10 239/593 |
| 9,175,688 | B2 | 11/2015 | Neel | |
| 9,587,650 | B2 * | 3/2017 | Yamada | F04F 5/24 |
| 10,486,189 | B2 | 11/2019 | Hiemer et al. | |
| 11,266,280 | B2 | 3/2022 | Ohtsu et al. | |
| 11,286,934 | B2 | 3/2022 | Pelikan et al. | |

FOREIGN PATENT DOCUMENTS

| | | | |
|---|---|---|---|
| CN | 209385308 | U | 9/2019 |
| CN | 212079583 | U | 12/2020 |
| CN | 213574526 | U | 6/2021 |
| CN | 113203215 | A | 8/2021 |
| CN | 113266554 | A | 8/2021 |
| CN | 115095556 | A | 9/2022 |
| TW | 200426306 | A | 12/2004 |
| TW | I267581 | B | 12/2006 |
| TW | 200844328 | A | 11/2008 |
| TW | M384932 | U | 7/2010 |
| TW | I432646 | B | 4/2014 |
| TW | I507604 | B | 11/2015 |
| TW | I533504 | B | 5/2016 |
| TW | I684707 | B | 2/2020 |
| TW | I699244 | B | 7/2020 |
| TW | I749995 | B | 12/2021 |

OTHER PUBLICATIONS

Zhibo Li et al., Simulation and Optimization of the Nozzle Section Geometry for a Suspension AbrasiveWater Jet, Machines, 10, 3, 2022.

Nazar Muneam Mahmood, Simulation of Back Pressure Effect on Behaviour of Convergent Divergent Nozzle, Diyala Journal of Engineering Sciences, vol. 06, No. 01, pp. 105-120, 2013.

Jung-Jae Park et al., Supersonic Nozzle Flow Simulations for Particle Coating Applications: Effects of Shockwaves, Nozzle Geometry, Ambient Pressure, and Substrate Location Upon Flow Characteristics, Journal of Thermal Spray Technology, vol. 20(3), 514-522, 2011.

J. X. Zhang, Analysis on the effect of venturi tube structural parameters on fluid flow, AIP Advances, 7, 2017.

Joo, J.H. et al., How to reduce the power consumption of vacuum pump in semiconductor industry, Journal of the Korean Vacuum Society, 17(4), pp. 278-291, 2008.

Fan Shi Kong et al., Application of Chevron nozzle to a supersonic ejector-diffuser system, Procedia Engineering, vol. 56, 2013, pp. 193-200.

* cited by examiner

PRESSURE DIFFERENCE GENERATING APPARATUS

CROSS REFERENCE TO RELATED APPLICATION

This application claims the benefits of Taiwan application Serial No. 111143352, filed on Nov. 14, 2022, the disclosures of which are incorporated by references herein in its entirety.

TECHNICAL FIELD

The present disclosure relates in general to a fluid pipeline dynamic energy improvement technology, and more particularly to a pressure difference generating apparatus that can meet a need of increasing dynamic energy in the pipeline to resolve a problem of insufficient dynamic energy in the pipeline system by utilizing the pressure difference formed by varying the fluid ate.

BACKGROUND

Taking the semiconductor manufacturing industry as an example, a vacuum pump is used to evacuate a semiconductor vacuum chamber and discharge the gas through a pipeline. In order to achieve energy saving of the pump, a common technical means used in the art is nothing more than using another auxiliary pump to generate a low vacuum, more than one check valve in combination with a nozzle-type vacuum generator, or another auxiliary pump in combination with a gas controller, so as to achieve the effect of pressure difference and avoid back pressure. However, obvious disadvantages include at least the increase of extra power consumption and cost.

Accordingly, how to achieve a "pressure difference generating device" with energy-saving effect is an urgent problem to be solved by people in the art.

SUMMARY

In one embodiment of this disclosure, a pressure difference generating apparatus includes:

- a first pipe, defined with an axis, having oppositely a first inlet and a first outlet along the axis and connected spatially to each other;
- a second pipe, having oppositely a second inlet and a second outlet along the axis and connected spatially to each other, disposed coaxially inside the first pipe, a neck portion being disposed between the second inlet and the second outlet, an inner diameter of the neck portion being less than an inner diameter of any of the second inlet and the second outlet, a conical inlet runner being formed between the second inlet and the neck portion, the conical inlet runner being parallel to the axis and tapered from the second inlet to the neck portion, a conical outlet runner being formed between the second outlet and the neck portion, the conical outlet runner being parallel to the axis and tapered from the second outlet to the neck portion; and
- a third pipe, having oppositely a third inlet and a third conical outlet portion, the third conical outlet portion having a third outlet, an inner diameter of the third outlet being less than an inner diameter of the third pipe, an outer diameter of the third outlet being less than an outer diameter of the third pipe, the third outlet being parallel to the axis and plugged into the conical inlet runner via the second inlet, the third conical outlet portion being disposed inside the conical inlet runner, an outer diameter of the third pipe being less than an inner diameter of the second inlet;
- wherein the first inlet allows a first fluid to enter the first pipe, the third inlet allows a second fluid to enter the third pipe, the first fluid and the second fluid have different flow rates, a negative pressure generated between the third conical outlet portion and the conical inlet runner has at least part of the first fluid to enter the conical inlet runner via the second inlet, then to enter the neck portion, and finally to enter the conical outlet runner, and the part of the first fluid mixes the second fluid to discharge together out of the second pipe via the second outlet.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein.

DETAILED DESCRIPTION

Figure 1:
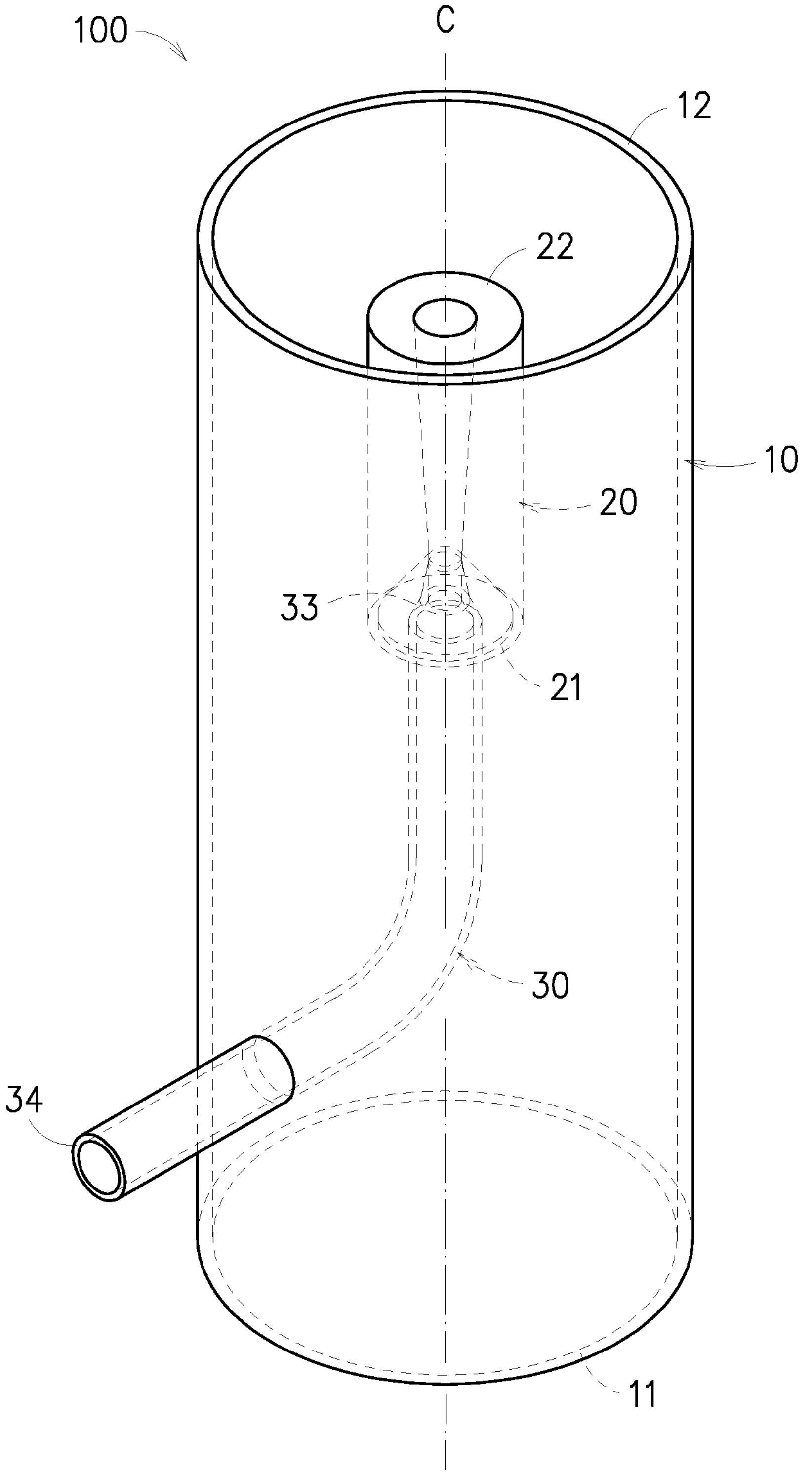
FIG. 1 is a schematic perspective view of an embodiment of the pressure difference generating apparatus in accordance with this disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2:
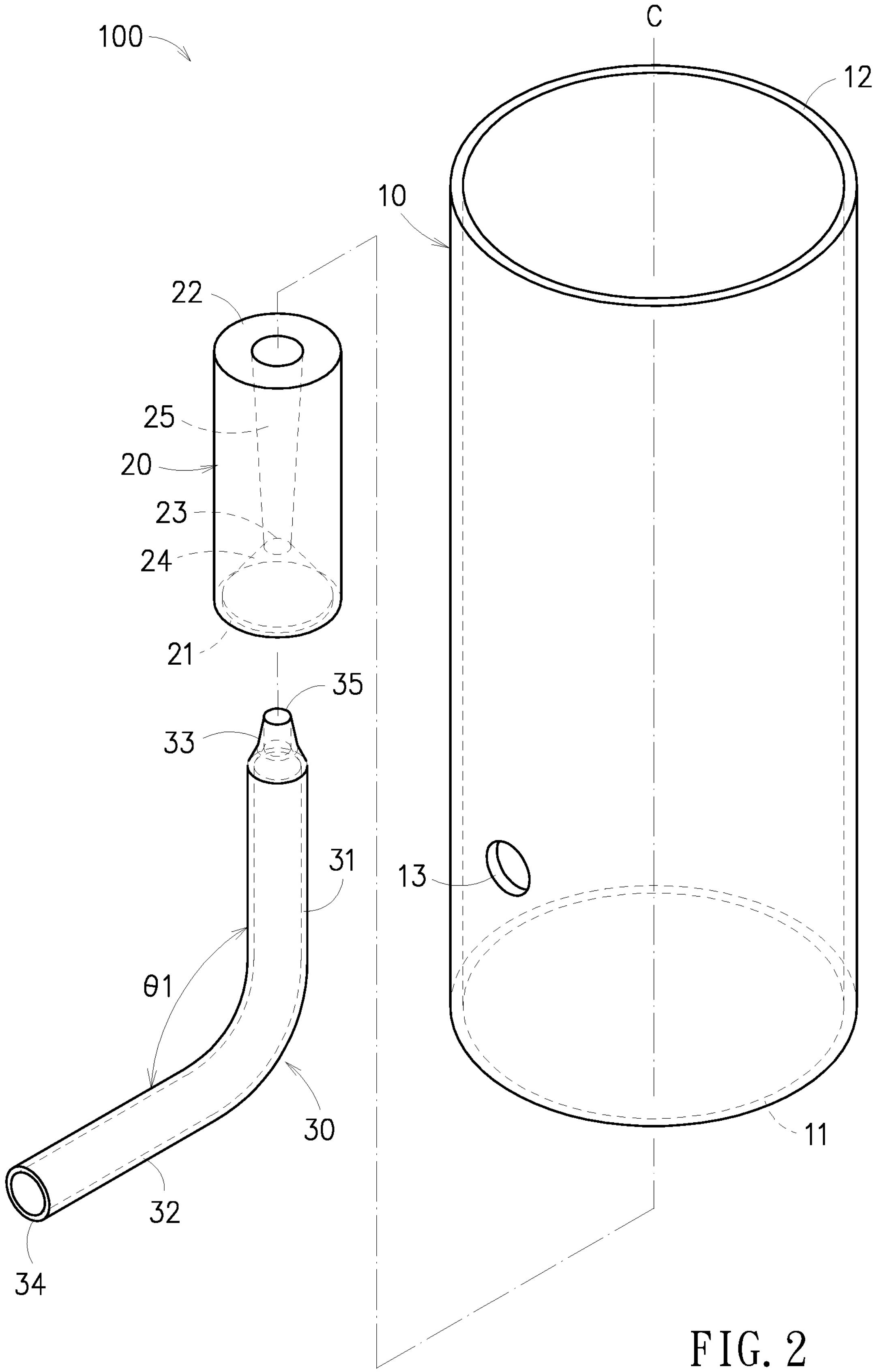
FIG. 2 is a schematic exploded view of FIG. 1.

Referring to FIG. 1 and FIG. 2, in this embodiment, a pressure difference generating apparatus 100 includes a first pipe 10, a second pipe 20 and a third pipe 30.

The first pipe 10 is defined with an axis C. As shown, the first pipe 10, constructed in parallel to the axis C, has oppositely a first inlet 11 and a first outlet 12 connected spatially to each other.

FIG. 2 shows that the first pipe 10 has a hole 13 penetrating radially through a wall of the first pipe 10. Thereupon, the third pipe 30 can be led into the first pipe 10 through the hole 13.

Figure 3:
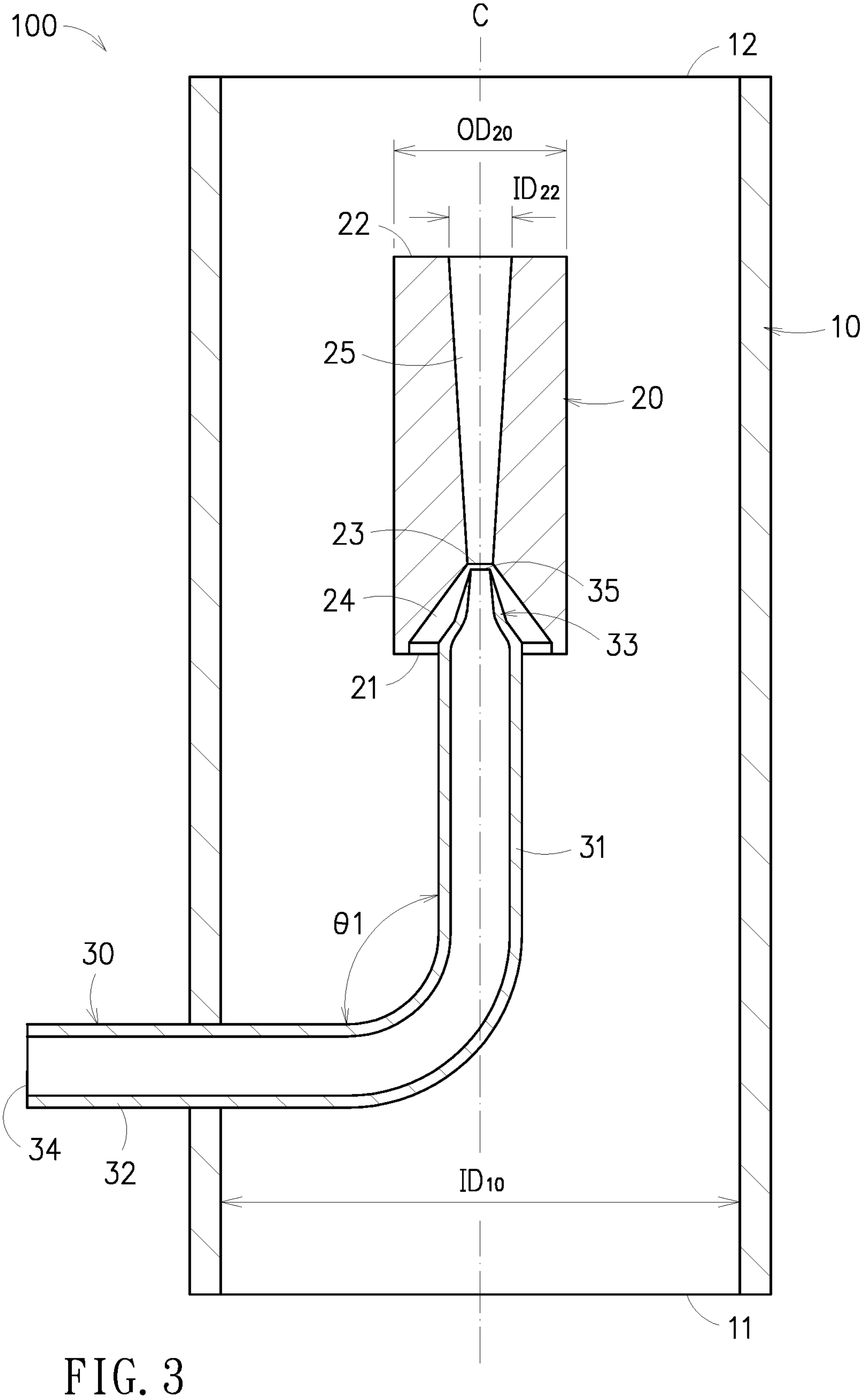
FIG. 3 is a schematic cross-sectional view of FIG. 1 along the axis.
Figure 4:
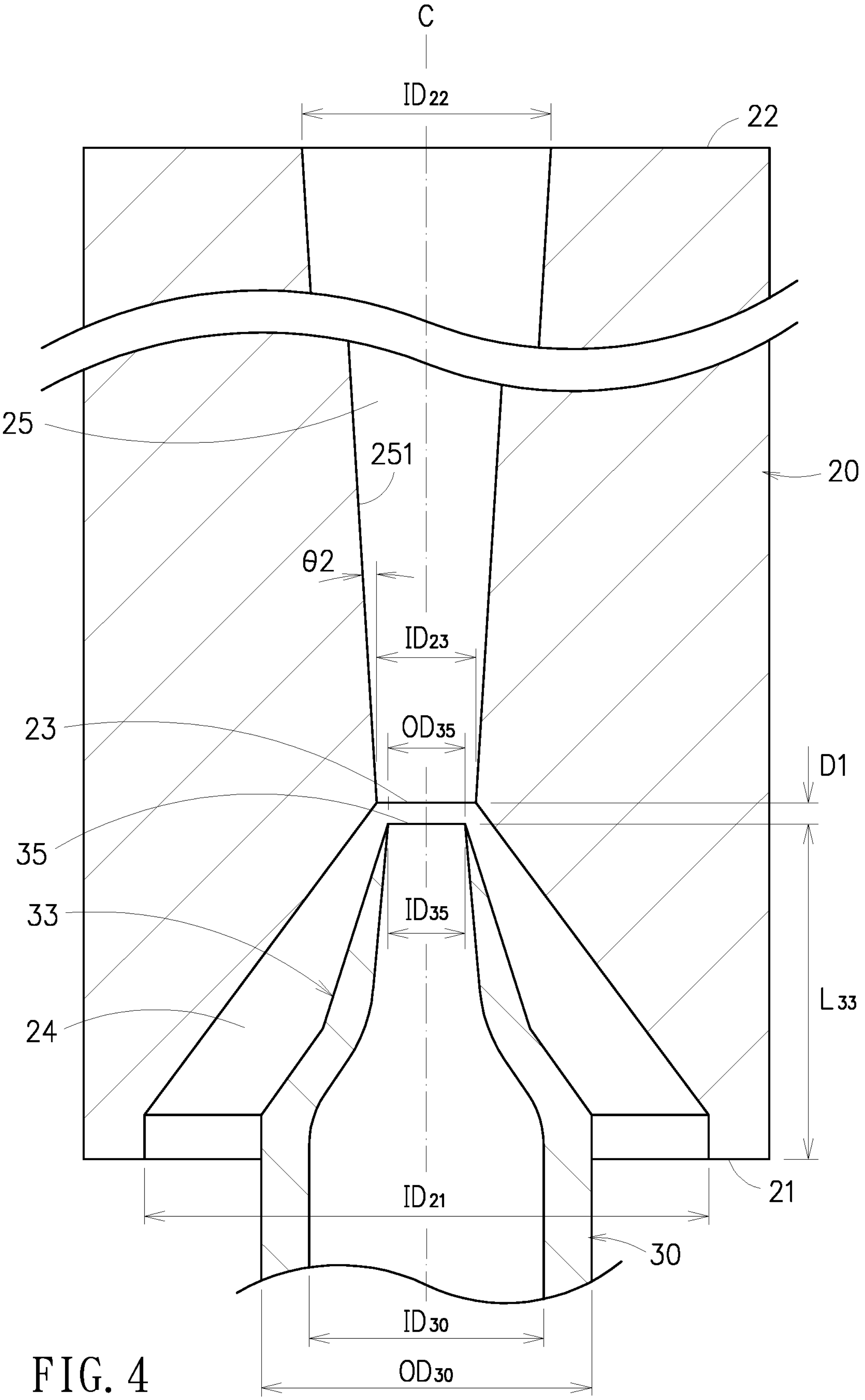
FIG. 4 demonstrates schematically an engagement of the second pipe and the third outlet portion of the third pipe of FIG. 1.

Referring to FIG. 3 and FIG. 4, the second pipe 20 in parallel to the axis C has oppositely a second inlet 21 and a second outlet 22 connected spatially with each other. The second pipe 20 is coaxially disposed inside the first pipe 10. In particularly, an inner diameter $ID_{10}$ of the first pipe 10 is greater than an outer diameter $OD_{20}$ of the second pipe 20.

Further, in this embodiment, a neck portion 23 provided between the second inlet 21 and the second outlet 22. An inner diameter $ID_{23}$ of the neck portion 23 is less than each of inner diameters $ID_{21}$, $ID_{22}$ of the second inlet 21 and the second outlet 22, respectively. A conical inlet runner 24 parallel to the axis C is formed between the second inlet 21 and the neck portion 23, and the conical inlet runner 24 is tapered from the second inlet 21 to the neck portion 23. In addition, a conical outlet runner 25 parallel to the axis C is formed between the second outlet 22 and the neck portion 23, and the conical outlet runner 25 is tapered from the second outlet 22 to the neck portion 23.

Referring to FIG. 1 to FIG. 3, the third pipe 30 is bent and thus divided into a first section 31 and a second section 32 connected spatially with each other, and an angle θ1 is formed between the first section 31 and the second section 32. In this embodiment, the angle θ1 is 90°.

The first section 31, axially parallel to the axis C, is disposed inside the first pipe 10. One axial end of the first section 31 (the upper end in the figure) is formed to be a third conical outlet portion 33.

The second section 32 penetrates across the first pipe 10, and an axial end thereof extends out of the first pipe 10 to be defined as a third inlet 34.

Referring to FIG. 4, the third outlet portion 33 has a third outlet 35. An inner diameter $ID_{35}$ of the third outlet 35 is less than an inner diameter $ID_{30}$ of the third pipe 30. An outer diameter $OD_{35}$ of the third outlet 35 is less than an outer diameter $OD_{30}$ of the third pipe 30. The outer diameter $OD_{30}$ of the third pipe 30 is less than an inner diameter $ID_{21}$ of the second inlet 21. In this embodiment, the inner diameter $ID_{35}$ of the third outlet is equal to the outer diameter $OD_{35}$ of the third outlet 35.

The third outlet 35 parallel to the axis C is protruded into the conical inlet runner 24C via the second inlet 21 so as to position the third outlet portion 33 inside the conical inlet runner 24.

Referring to FIG. 4, in this embodiment, the second inlet 21, the neck portion 23, the conical outlet runner 25 and the third outlet 35 are sized to meet the specialty of this disclosure.

In this embodiment, the inner diameter $ID_{30}$ of the third pipe 30 is 2~3 times of the inner diameter $ID_{35}$ of the third outlet 35. For example, in the case that the inner diameter $ID_{35}$ of the third outlet 35 is equal to 2 mm, then the inner diameter $ID_{30}$ of the third pipe 30 can be ranged within 4~6 mm.

A length L33 of a portion of the third outlet portion 33 in parallel to the axis C is 4~5 times of the inner diameter $ID_{35}$ of the third outlet 35. For example, in the case that the inner diameter $ID_{35}$ of the third outlet 35 is equal to 2 mm, then the length L33 can be within 8~10 mm.

An angle θ2 within 3~4° is formed between an inner sidewall 251 of the conical outlet runner 25 and the axis C.

In a direction parallel to the axis C, a distance D1 between the third outlet 35 and the neck portion 23 is less than the inner diameter $ID_{35}$ of the third outlet 35.

Figure 5:
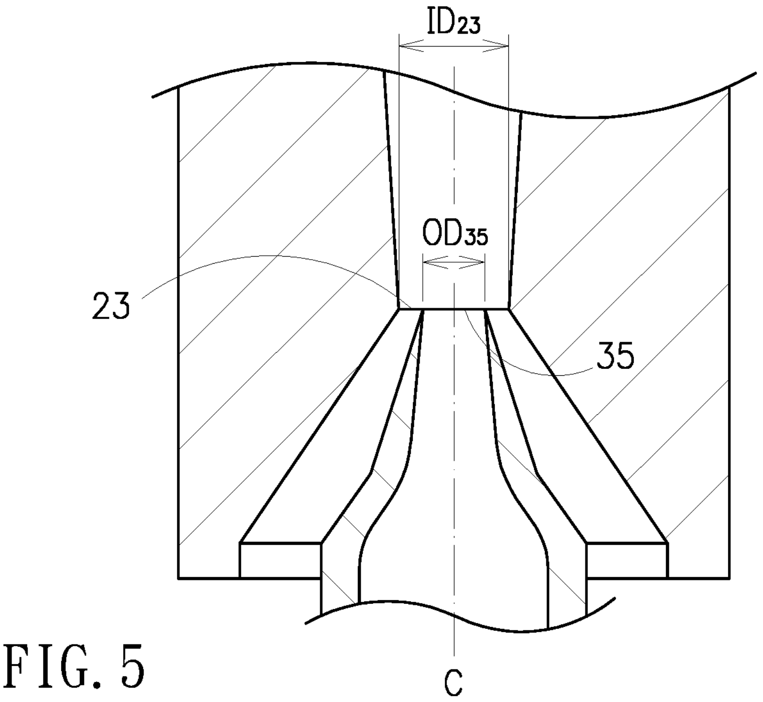
FIG. 5 to FIG. 8 demonstrate schematically four different states of the engagement of the second pipe and the third outlet portion of the third pipe of FIG. 1.

Referring to FIG. 5, in this embodiment, an inner diameter $ID_{23}$ of the neck portion 23 is greater than the outer diameter $OD_{35}$ of the third outlet 35. In the direction parallel to the axis C, a distance D1 between the third outlet 35 and the neck portion 23 is equal to 0.

Figure 6:
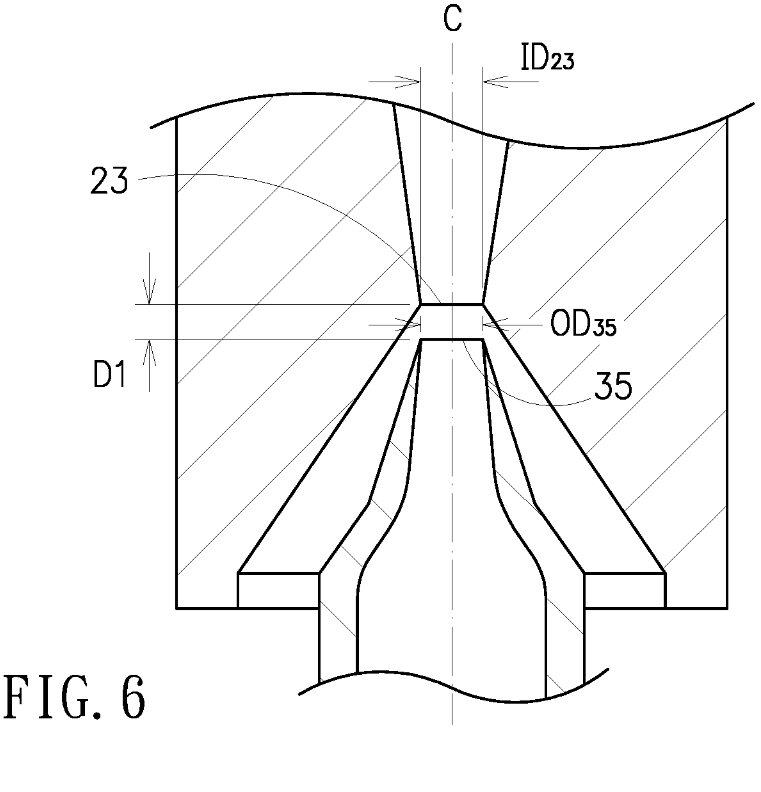

Referring to FIG. 6, in this embodiment, the inner diameter $ID_{23}$ of the neck portion 23 is equal to the outer diameter $OD_{35}$ of the third outlet 35. In the direction parallel to the axis C, a distance D1 between the third outlet 35 and the neck portion 23 is greater than 0.

Figure 7:
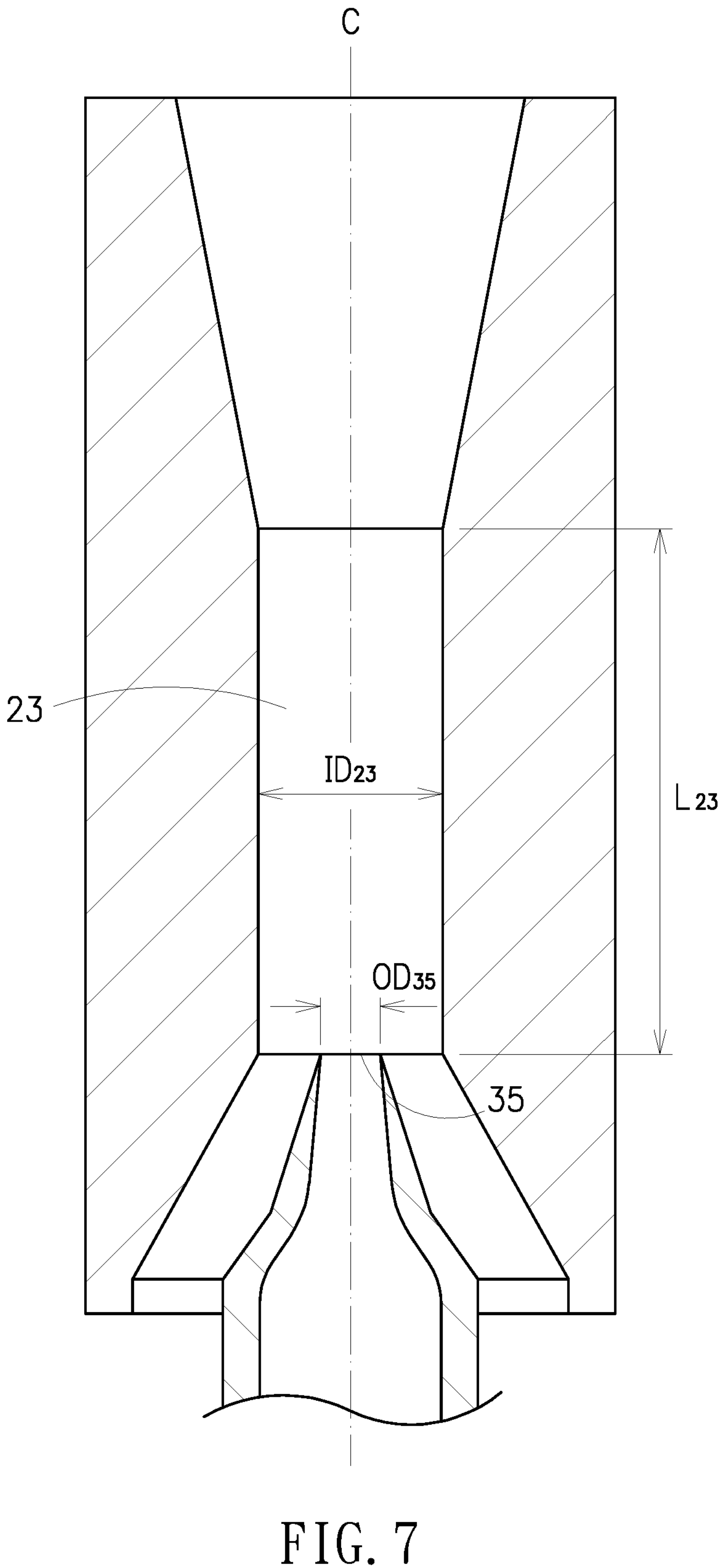

Referring to FIG. 7, in this embodiment, the neck portion 23 has a length L23 parallel to the axis C, and the inner diameter $ID_{23}$ of the neck portion 23 is greater than the outer diameter $OD_{35}$ of the third outlet 35. In the direction parallel to the axis C, a distance D1 between the third outlet 35 and the neck portion 23 is equal to 0.

Figure 8:
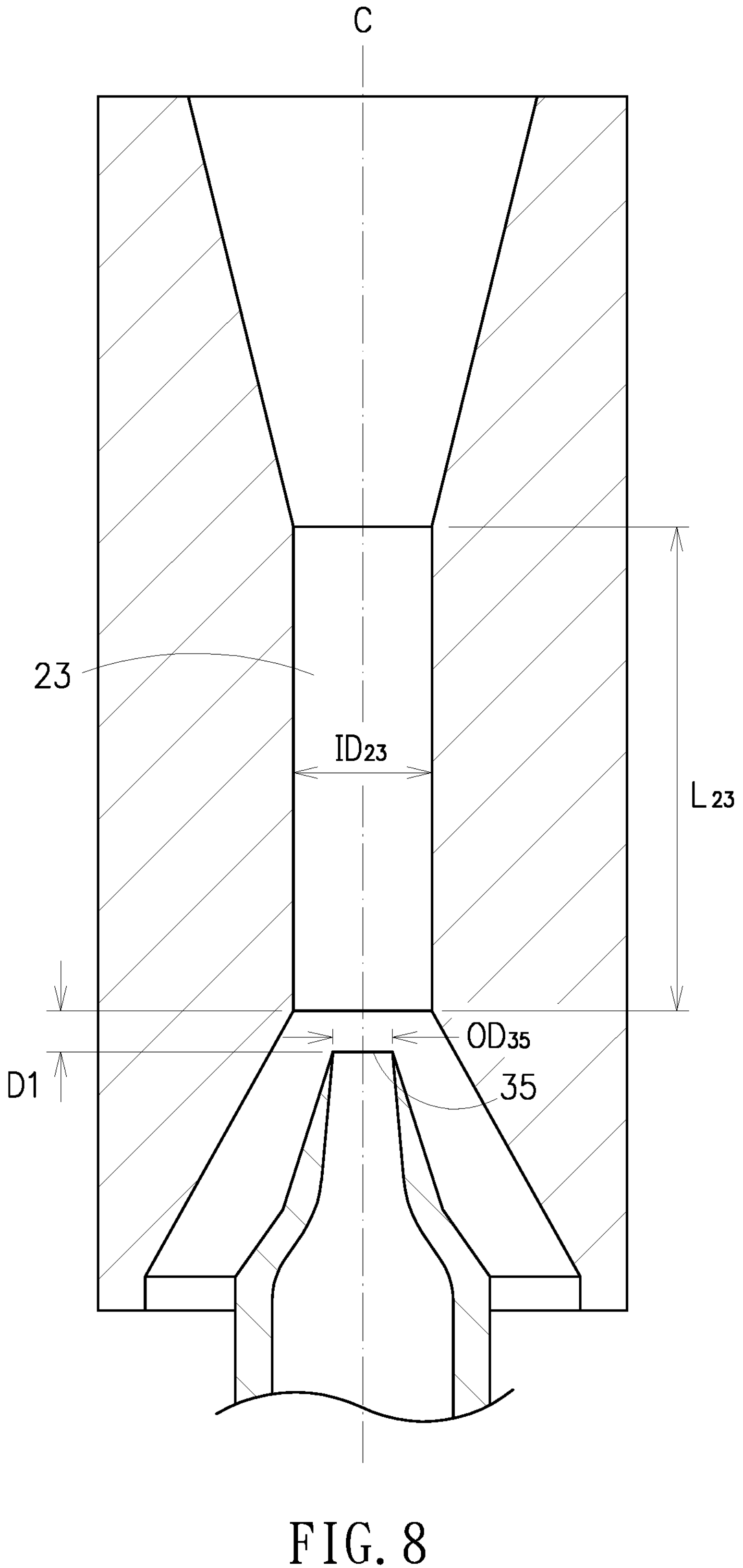

Referring to FIG. 8, in this embodiment, the neck portion 23 has the length L23 parallel to the axis C, and the inner diameter $ID_{23}$ of the neck portion 23 is greater than the outer diameter $OD_{35}$ of the third outlet 35. In the direction parallel to the axis C, a distance D1 between the third outlet 35 and the neck portion 23 is greater than 0.

It shall be noted that the length L23 in FIG. 7 or and FIG. 8 isn't particularly limited to the aforesaid design, but shall be determined per practical requirements.

Figure 9:
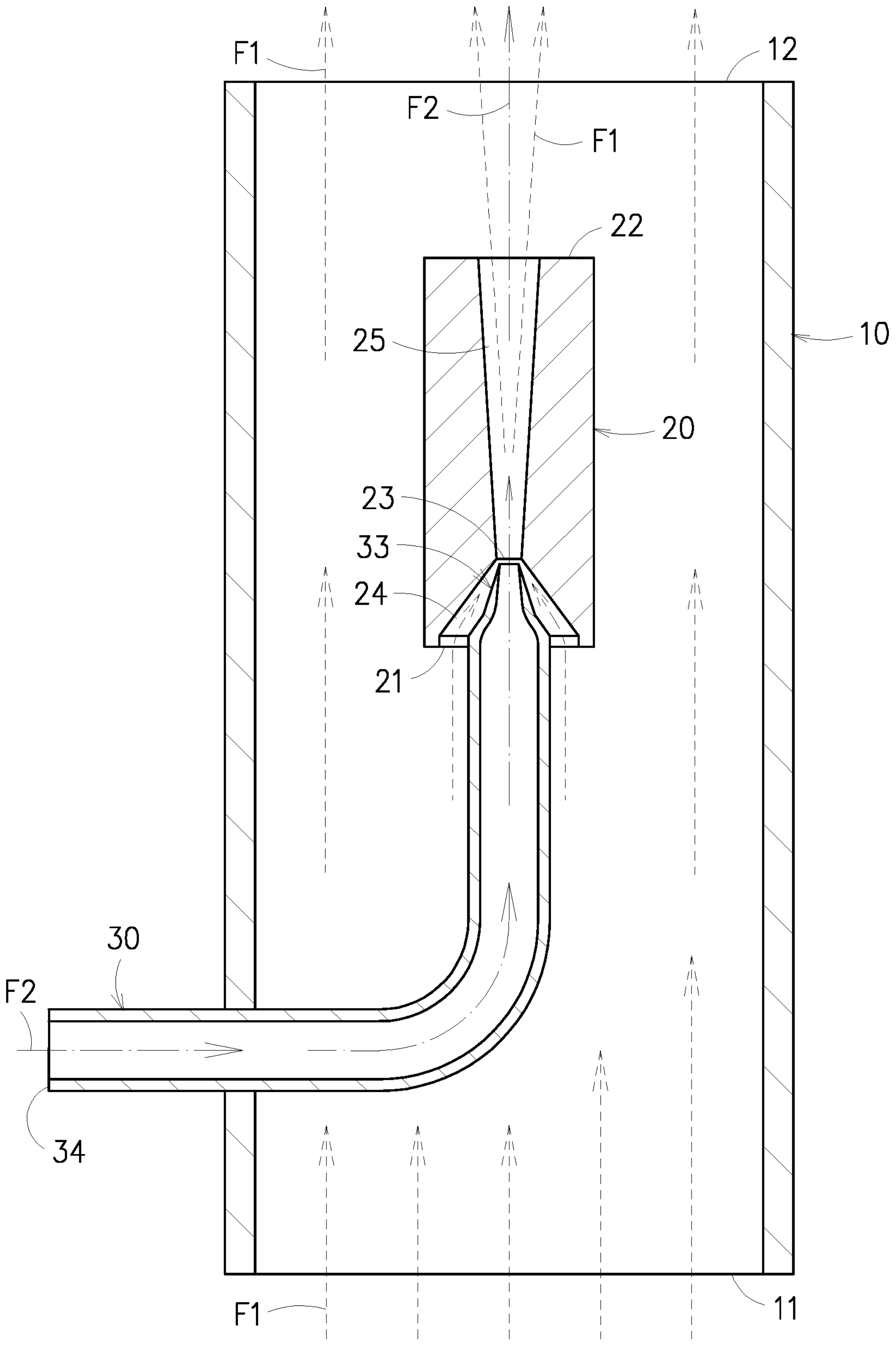
FIG. 9 shows schematically flows of an exemplary example using the pressure difference generating apparatus of FIG. 1.

Referring to FIG. 9, the first inlet 11 allows a first fluid F1 to enter the first pipe 10, and the third inlet 34 allows a second fluid F2 to enter the third pipe 30.

The type of the first fluid F1 is not limited. For example, the first fluid F1 can be one of nitrogen, inert gases and air. In addition, the type of the second fluid F2 is not limited. For example, the second fluid F2 can be one of dry air, nitrogen and argon.

In this embodiment, the first fluid F1 and the second fluid F2 are set to have different flow rates. For example, the flow rate of the first fluid F1 can be greater than or equal to 0 m/s, and the flow rate of the second fluid F2 is generated by a compressed gas having a pressure greater than or equal to 2 $Kg\text{-}f/cm^2$ (0.196 MPa). However, the first fluid F1 and the second fluid F2 are not related in flow rate. If and only if the pressure (negative pressure) generated by the second fluid F2 is less than the pressure of the first fluid F1, then the target goal in energy saving can be achieved.

Since the first fluid F1 and the second fluid F2 provide different flow rates, thus a negative pressure would be formed between the third outlet portion 33 and the conical inlet runner 24 so as to provide a ring-shaped vacuum zone. Thereupon, part of the first fluid F1 can take the second inlet 21 to enter the conical inlet runner 24, the neck portion 23 and then the conical outlet runner 25, and the second fluid F2 flows out of the second pipe 20 via the second outlet 22, and then mixes the rest of the first pipe F1 to together flow out of the first pipe 10 via the first outlet 12 thereof.

Figure 10:
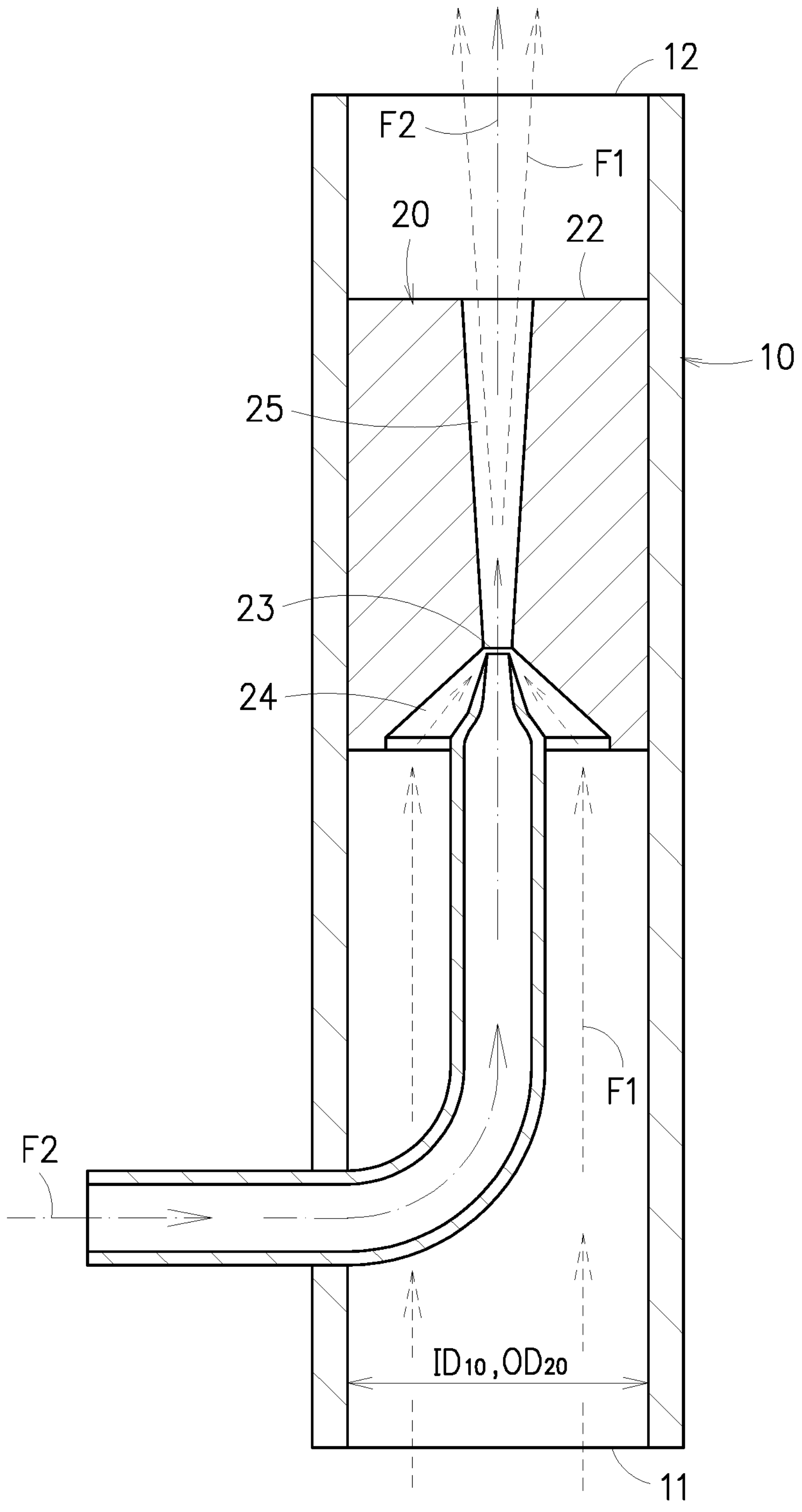
FIG. 10 shows schematically flows of another exemplary example using the pressure difference generating apparatus of FIG. 1, where an inner diameter of the first pipe is equal to an outer diameter of the second pipe.

Referring to FIG. 10, in this embodiment, the inner diameter $ID_{10}$ of the first pipe 10 is equal to the outer diameter $OD_{20}$ of the second pipe 20. In this embodiment, since the inner sidewall of the first pipe 10 is tightly contacted with an outer sidewall of the second pipe 20, then the first fluid F1 would completely enter the conical inlet runner 24 and further pass through the neck portion 23 to enter the conical outlet runner 25. As such, the first fluid F1 and the second fluid F2 together would flow out of the second pipe 20 via the second outlet 22, and further flow out of the first pipe 10 via the first outlet 12 of the first pipe 10.

Figure 11:
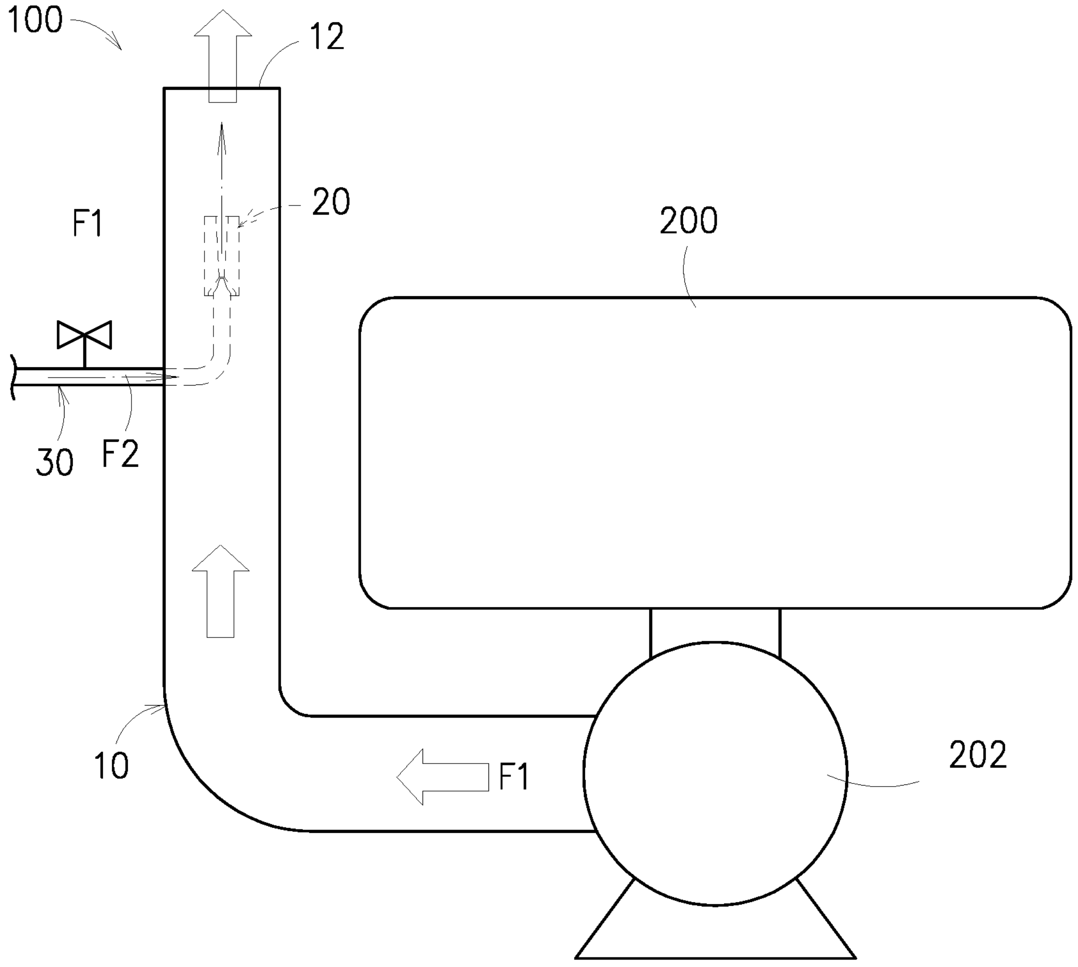
FIG. 11 shows schematically a further exemplary example using the pressure difference generating apparatus of FIG. 1 to a vacuum chamber.

Referring to FIG. 11, the pressure difference generating apparatus 100 of this disclosure can be applied to a vacuum chamber 200. The vacuum chamber 200 can be a vacuum chamber for the semiconductor chip process. As shown, the first pipe 10 is connected with the vacuum pump 202, such as an exhaust end thereof. The vacuum pump 202 vacuums the vacuum chamber 200 to send the first fluid F1 inside the vacuum chamber 200 into the first pipe 10. The negative pressure, generated while the third pipe 30 is applied to send the second fluid F2 into the second pipe 20, would induce a suction upon the first fluid F1, such that the first fluid F1 can be accelerated to mix the second fluid F2, and to discharge via the first outlet 12 of the first pipe 10.

It shall be explained that, as shown in FIG. 3, the length of the first pipe 10 along the axis C is determined up to practical use situations, not particularly limited to the length shown in any of FIG. 1 to FIG. 11. Similarly, the length of the second pipe 20 along the axis C and the position of the second pipe 20 inside the first pipe 10 are also up to practical requirements. Regarding the third pipe 30, it is not also limited to have a 90° curve, but any that can provide a third outlet 35 to be parallel to the axis C, to engage the conical inlet runner 24 by plugging into the second inlet 21, and to dispose the third outlet portion 33 inside the conical inlet runner 24 would be acceptable according to this disclosure.

To sum up, in the differential pressure generating device provided in this disclosure, the requirement of increasing the fluid dynamic energy in the pipeline is satisfied by the pressure difference formed by varying the flow rates. Thereupon, the problem of insufficient fluid dynamic energy in the pipeline system can be solved, the pipeline back pressure and the exhaust resistance (pressure) can be reduced, and then the goal in saving energy can be achieved.

With respect to the above description then, it is to be realized that the optimum dimensional relationships for the parts of the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present disclosure.

What is claimed is:

1. A pressure difference generating apparatus, comprising:

a first pipe, defined with an axis, having oppositely a first inlet and a first outlet along the axis and connected spatially to each other;

a second pipe, having oppositely a second inlet and a second outlet along the axis and connected spatially to each other, disposed coaxially inside the first pipe, a neck portion being disposed between the second inlet and the second outlet, an inner diameter of the neck portion being less than an inner diameter of any of the second inlet and the second outlet, a conical inlet runner being formed between the second inlet and the neck portion, the conical inlet runner being parallel to the axis and tapered from the second inlet to the neck portion, a conical outlet runner being formed between the second outlet and the neck portion, the conical outlet runner being parallel to the axis and tapered from the second outlet to the neck portion; and a third pipe, having oppositely a third inlet and a third conical outlet portion, the third conical outlet portion having a third outlet, an inner diameter of the third outlet being less than an inner diameter of the third pipe, an outer diameter of the third outlet being less than an outer diameter of the third pipe, the third outlet being parallel to the axis and plugged into the conical inlet runner via the second inlet, the third conical outlet portion being disposed inside the conical inlet runner, an outer diameter of the third pipe being less than an inner diameter of the second inlet;

wherein the first inlet allows a first fluid to enter the first pipe, the third inlet allows a second fluid to enter the third pipe, the first fluid and the second fluid have different flow rates, a negative pressure generated between the third conical outlet portion and the conical inlet runner has at least part of the first fluid to enter the conical inlet runner via the second inlet, then to enter the neck portion, and finally to enter the conical outlet runner, and the part of the first fluid mixes the second fluid to discharge together out of the second pipe via the second outlet.

2. The pressure difference generating apparatus of claim 1, wherein the inner diameter of the neck portion is equal to an outer diameter of the third outlet, and a distance between the third outlet and the neck portion is greater than 0 along the axis.

3. The pressure difference generating apparatus of claim 1, wherein the inner diameter of the neck portion is greater than an outer diameter of the third outlet, and a distance between the third outlet and the neck portion is equal to or greater than 0 along the axis.

4. The pressure difference generating apparatus of claim 1, wherein a distance between the third outlet and the neck portion is less than an inner diameter of the third outlet along the axis.

5. The pressure difference generating apparatus of claim 1, wherein a length of the third conical outlet portion along the axis is 4~5 times of the inner diameter of the third outlet.

6. The pressure difference generating apparatus of claim 1, wherein an angle between an inner sidewall of the conical outlet runner and the axis is within 3~4°.

7. The pressure difference generating apparatus of claim 1, wherein the inner diameter of the third pipe is 2~3 times of the inner diameter of the third outlet.

8. The pressure difference generating apparatus of claim 1, wherein an inner diameter of the first pipe is equal to or greater than an outer diameter of the second pipe.

9. The pressure difference generating apparatus of claim 1, wherein the neck portion has a length parallel to the axis.

10. The pressure difference generating apparatus of claim 1, wherein the third pipe is bent to has a first section and a second section connected spatially to each other, an angle is formed between the first section and the second section, the first section is disposed coaxially inside the first pipe, an axial end of the first section has the third conical outlet portion, the second section extends into the first pipe, and another axial end of the second section out of the first pipe is the third inlet.

11. The pressure difference generating apparatus of claim 1, wherein the first fluid includes one of nitrogen, inert gases and air.

12. The pressure difference generating apparatus of claim 1, wherein the second fluid includes one of dry air, nitrogen and argon.

* * * * *